(12) United States Patent
Yoon (10) Patent No.: US 9,806,388 B2
(45) Date of Patent: Oct. 31, 2017

(54) BATTERY SYSTEM AND DRIVING METHOD THEREOF

(71) Applicants: Samsung SDI Co., Ltd., Yongin-si, Gyeonggi-do (KR); Robert Bosch GmbH, Stuttgart (DE)

(72) Inventor: Jihyoung Yoon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/986,374

(22) Filed: Dec. 31, 2015

(65) Prior Publication Data

US 2016/0118697 A1    Apr. 28, 2016

Related U.S. Application Data

(62) Division of application No. 12/817,374, filed on Jun. 17, 2010, now Pat. No. 9,246,197.

(30) Foreign Application Priority Data

Feb. 3, 2010   (KR) .................... 10-2010-0009906

(51) Int. Cl.
| | |
|---|---|
| H01M 10/633 | (2014.01) |
| H01M 10/625 | (2014.01) |
| H01M 10/613 | (2014.01) |
| H01M 10/48 | (2006.01) |
| H01M 10/42 | (2006.01) |
| H01M 10/61 | (2014.01) |
| H01M 10/617 | (2014.01) |
| H01M 10/63 | (2014.01) |
| H01M 10/60 | (2014.01) |

(52) U.S. Cl.
CPC ..... *H01M 10/633* (2015.04); *H01M 10/4228* (2013.01); *H01M 10/48* (2013.01); *H01M 10/482* (2013.01); *H01M 10/486* (2013.01); *H01M 10/60* (2015.04); *H01M 10/61* (2015.04); *H01M 10/613* (2015.04); *H01M 10/617* (2015.04); *H01M 10/625* (2015.04); *H01M 10/63* (2015.04); *H01M 2220/20* (2013.01); *Y02T 10/7005* (2013.01)

(58) Field of Classification Search
CPC .... H01M 10/60; H01M 10/61; H01M 10/617; H01M 10/63
See application file for complete search history.

(56) References Cited

U.S. PATENT DOCUMENTS

| | | |
|---|---|---|
| 5,730,237 A | 3/1998 | Matsuki et al. |
| 5,824,432 A | 10/1998 | Currle |
| 2005/0202310 A1 | 9/2005 | Yahnker et al. |
| 2008/0292948 A1 | 11/2008 | Kumar et al. |
| 2009/0004511 A1 | 1/2009 | Hlavac |

FOREIGN PATENT DOCUMENTS

| | | |
|---|---|---|
| JP | 2003-331932 | 11/2003 |
| JP | 2005-209368 | 8/2005 |
| KR | 10-2006-0059452 | 6/2006 |
| KR | 10-0612237 B1 | 8/2006 |
| KR | 10-0778435 B1 | 11/2007 |

OTHER PUBLICATIONS

KIPO Notice of Allowance dated Jul. 20, 2011, for Korean priority Patent application 10-2010-0009906, 5 pages.
Korean Patent Abstract, Publication 10-2006-0059453, corresponding to Korean Patent 10-0612237.
Korean Patent Abstract, Publication 10-2007-0006000, corresponding to Korean Patent 10-0778435.
Patent Abstract of Japan, and English machine translation of Japan Publication 2005-209368, 9 pages.
Patent Abstracts of Japan and English Machine Translation of Japanese Publication No. 2003-331932.

*Primary Examiner* — Ladan Mohaddes
(74) *Attorney, Agent, or Firm* — Lewis Roca Rothgerber Christie LLP (57) ABSTRACT

A battery system capable of cooling overheated battery packs among a plurality battery packs each mounted in a battery case by measuring temperatures of the battery packs is disclosed, and a driving method thereof is provided. In one embodiment, the battery system includes a plurality of battery packs, an air compressor for supplying a compressed cooling air to the plurality of battery packs, a gas dividing unit coupled between the plurality of battery packs and the air compressor and including a plurality of valves, and a controller for controlling opening and closing of each of the plurality of valves according to temperatures of the plurality of battery packs.

4 Claims, 7 Drawing Sheets

BATTERY SYSTEM AND DRIVING METHOD THEREOF

CROSS-REFERENCE TO RELATED APPLICATION

This application is a divisional of U.S. patent application Ser. No. 12/817,374, filed Jun. 17, 2010, now U.S. Pat. No. 9,246,197, which claims priority to and the benefit of Korean Patent Application No. 10-2010-0009906, filed Feb. 3, 2010, the entire content of both of which is incorporated herein by reference.

BACKGROUND

1. Field

Aspects of embodiments of the present invention relate to a battery system and a driving method thereof.

2. Description of the Related Art

Vehicles having an internal combustion engine run on gasoline or heavy oil have caused serious air pollution. Accordingly, electric or hybrid vehicles have been developed to reduce air pollution.

An electric vehicle uses an electric motor powered by electrical energy output by a battery. The electric vehicle typically uses a battery formed as one battery module including a plurality of rechargeable/dischargeable battery packs.

The battery formed as one battery module including a plurality of rechargeable/dischargeable battery packs is placed in a battery case. When any one of the plurality of battery packs is overheated, the overall temperature of the battery may rise, and known methods of cooling the battery are costly and time consuming.

SUMMARY

An aspect of embodiments of the present invention is directed toward a battery system capable of rapidly cooling an overheated battery pack among a plurality of battery packs by measuring temperatures of the respective battery packs, and a driving method thereof.

Another aspect of the embodiments of the present invention is directed toward a battery system capable of detecting gas leaking from a battery pack among a plurality of battery packs and degassing the battery pack with the gas leakage.

One embodiment of the present invention provides a battery system including a plurality of battery packs, an air compressor for supplying a compressed cooling air to the plurality of battery packs, a gas dividing unit coupled between the plurality of battery packs and the air compressor, the gas dividing unit including a plurality of valves, and a controller for controlling opening and closing of each of the plurality of valves according to temperatures of the plurality of battery packs.

In an embodiment of the present invention, the controller may be configured to open a corresponding one of the valves when a temperature of a battery pack of the plurality of battery packs is higher than a first reference temperature. In addition, the controller may be configured to open a valve of the air compressor when a temperature of at least one of the plurality of battery packs is higher than a first reference temperature. The controller may be configured to open a corresponding one of the valves when a gas is generated from a battery pack of the plurality of battery packs. The controller may be configured to open a valve of the air compressor when a gas is generated from at least one of the plurality of battery packs.

A battery pack of the battery packs may include an inlet for receiving a gas into the battery pack, and an outlet for discharging a gas out of the battery pack.

The battery pack may include a distribution member located inside the entrance part for distributing the gas. The battery system may further include an entrance pipe coupled to the inlet for receiving the gas from the gas dividing unit into the battery pack, and an exit pipe coupled to the outlet for discharging the gas out of the battery pack. A diameter of the exit pipe may be equal to or greater than a diameter of the entrance pipe. The battery packs may include a first battery pack and a second battery pack that is located farther from the gas dividing unit than the first battery pack, and a diameter of an entrance pipe coupled to the second battery pack may be larger than that of an entrance pipe coupled to the first battery pack.

The gas dividing unit may further include an extinguishing unit for supplying a compressed extinguishing gas to the plurality of battery packs The controller may be configured to open a valve of the extinguishing unit when a temperature of at least one of the plurality of battery packs is higher than a second reference temperature. The controller may be configured to open a corresponding one of the plurality of valves when a temperature of a battery pack of the plurality of battery packs is higher than a second reference temperature.

The extinguishing gas may be a compressed incombustible gas selected from the group consisting of carbon dioxide ($CO_2$), nitrogen (N), argon (Ar), neon (Ne), helium (He), krypton (Kr), and a combination thereof.

Another embodiment of the present invention provides a driving method of a battery system including measuring temperatures of a plurality of battery packs; comparing the measured temperatures of the plurality of battery packs with a first reference temperature; determining whether there is an overheated battery pack among the battery packs; and cooling the overheated battery pack.

The cooling of the overheated battery pack may include opening a valve of an air compressor for providing a cooling air to the overheated battery pack. The cooling of the overheated battery pack may also include opening a valve of a gas dividing unit corresponding to the overheated battery pack.

The comparing of the battery pack temperatures with the first reference temperature may include setting a second reference temperature higher than the first reference temperature.

When at least one of the temperatures of the battery packs is higher than the second reference temperature, the cooling of the overheated battery pack may include opening a valve of an extinguishing unit.

Another embodiment of the present invention provides a driving method of a battery system including detecting a gas leakage from a plurality of battery packs, notifying a controller of a battery pack that leaks a gas among the plurality of battery packs, and releasing the gas to the outside of the battery pack leaking the gas.

The releasing of the gas may include opening a valve of an air compressor coupled to the battery pack.

As described above, in the battery system according to embodiments of the present invention, and a driving method thereof, a plurality of battery packs are placed in a battery case, and an overheated battery pack among the plurality of battery packs is detected by measuring temperatures of the respective battery packs, thereby cooling the overheated battery pack. Therefore, according to embodiments of the present invention, only the overheated battery pack among the plurality of battery packs is selectively cooled, thereby improving the overall battery performance.

According to another embodiment of the present invention, a plurality of battery packs are placed in a battery case, amounts of gas generated from the respective battery packs are measured to detect a battery pack associated with gas leakage among the plurality of battery packs, and the gas generated from battery pack associated with gas leakage is released, thereby improving the overall battery performance.

Additional aspects and/or features of the invention will be set forth in the description which follows.

BRIEF DESCRIPTION OF THE DRAWINGS

The features and aspects of embodiments of the present invention will be more apparent from the following detailed description in conjunction with the accompanying drawings, in which.

DETAILED DESCRIPTION

Example embodiments will now be described more fully hereinafter with reference to the accompanying drawings; these embodiments are provided so that this disclosure will be thorough and complete. As those skilled in the art would realize, the described embodiments may be modified in various different ways, all without departing from the spirit or scope of the present invention.

Figure 1:
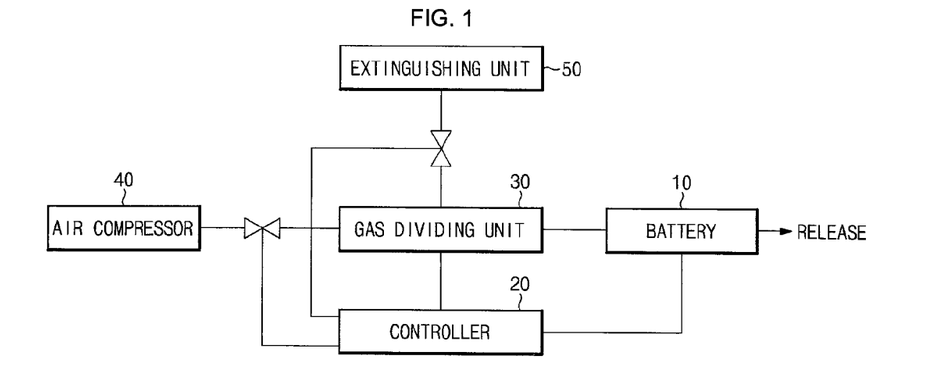
FIG. 1 is a block diagram schematically illustrating a battery system according to an embodiment of the present invention.
Figure 2:
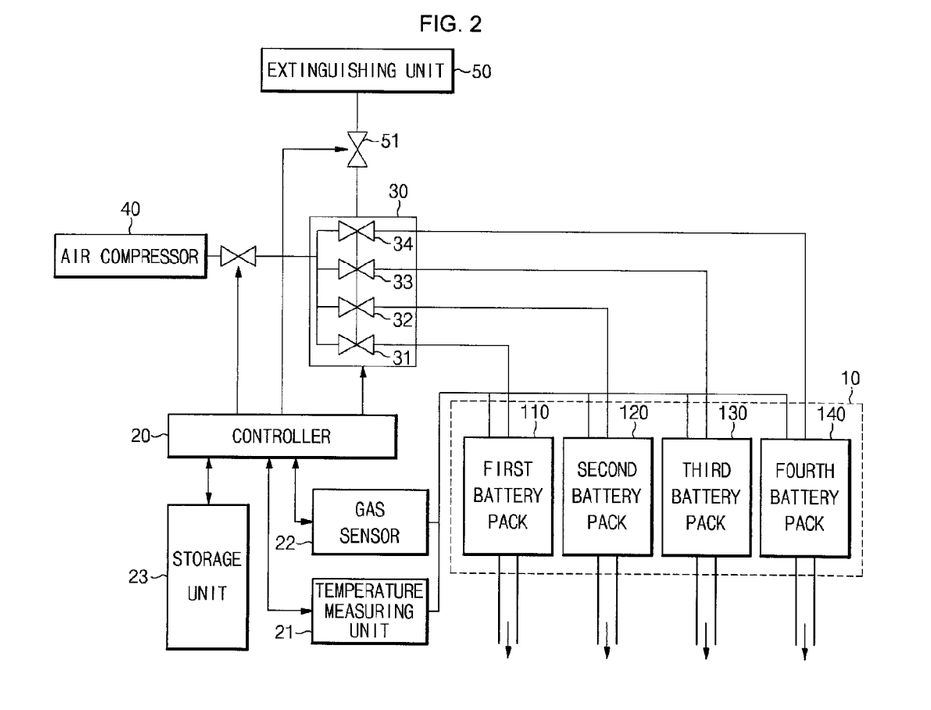
FIG. 2 is a block diagram of the battery system shown in FIG. 1 in more detail.
Figure 3A:
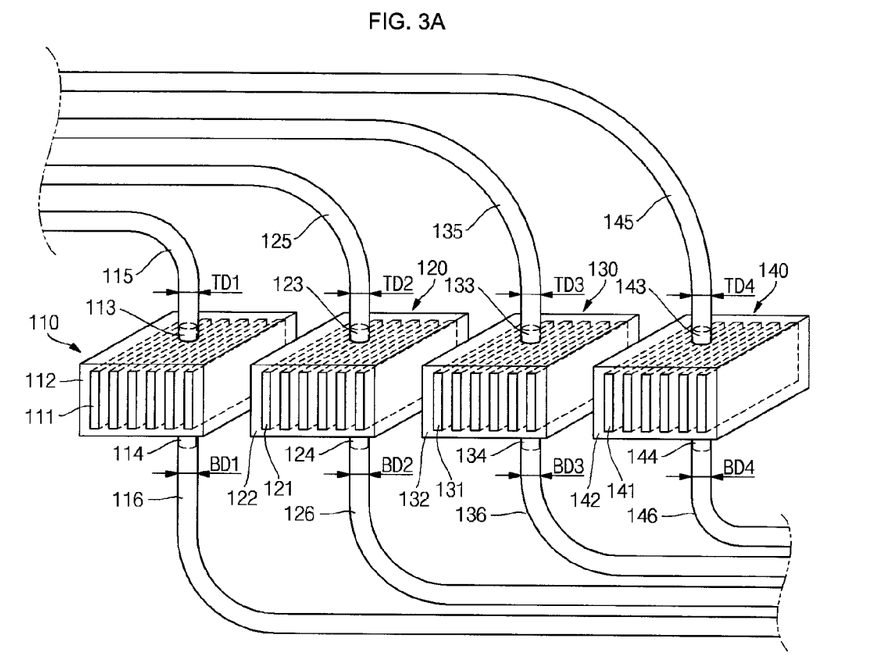
FIG. 3A is a perspective view of the battery system shown in FIG. 2.
Figure 3B:
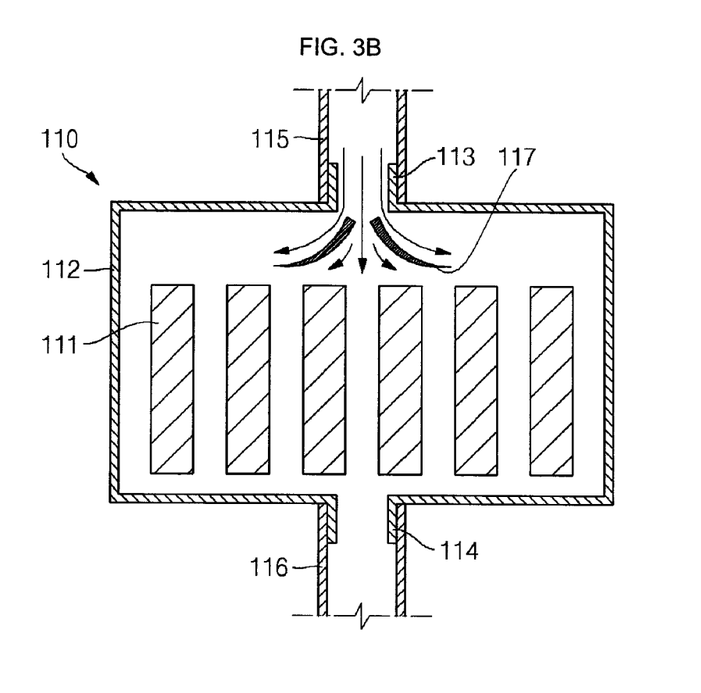
FIG. 3B is a cross-sectional view of a battery pack shown in FIG. 3A.

FIG. 1 is a block diagram schematically illustrating a battery system according to an embodiment of the present invention, FIG. 2 is a block diagram of the battery system shown in FIG. 2 in more detail, FIG. 3A is a perspective view of the battery system shown in FIG. 2, and FIG. 3B is a cross-sectional view of a battery pack shown in FIG. 3A.

Referring to FIGS. 1 and 3, the battery system according to an embodiment of the present invention includes a battery 10, a controller 20, a gas dividing unit 30, an air compressor 40, and an extinguishing unit 50.

The battery 10 includes a plurality of battery packs (e.g., 110, 120, 130, and 140 shown in FIG. 2) connected in series to each other. In the illustrated embodiment, the plurality of battery packs 110, 120, 130, and 140 include four packs, which are defined as a first battery pack 110, a second battery pack 120, a third battery pack 130, and a fourth battery pack 140. In the illustrated embodiment, the battery 10 includes a total of 24 battery cells, that is, the first to fourth battery packs 110-140 each include six rechargeable battery cells connected in series to each other, but aspects of the present invention are not limited thereto. Here, each battery pack is indicated by a group of a plurality of battery cells, which is provided only for the illustrative purpose. Rather, the battery 10 may be configured by directly connecting 24 battery cells to each other without having to differentiate the battery cells into the first to fourth battery packs 110-140.

In FIG. 3A, the first battery pack 110 includes a plurality of battery cells 111, and a case 112 in which the plurality of battery cells 111 are located. An entrance part 113 (e.g., an inlet), through which gas moves in, is formed on a top surface of the case 112, and an exit part 114 (e.g., an outlet), through which gas moves out, is formed on a bottom surface of the case 112.

The entrance part 113 protrudes upwardly from the case 112, and an entrance pipe 115 that is a flow channel for gas passage is joined to the entrance part 113. In addition, a distribution member 117 (shown in FIG. 3B) is formed inside the entrance part 113. Further, the distribution member 117 may be fixed to the entrance part 113 by a separate connection member. In one embodiment, the distribution member 117 is suitably shaped (e.g., shaped like a fallopian tube) to distribute the gas introduced through the entrance pipe 115 to all over the case 112. Therefore, the distribution member 117 allows the plurality of battery cells 111 to be more efficiently cooled.

The exit part 114 protrudes downwardly from the case 112, and an exit pipe 116 that is a flow channel for gas passage is joined to the exit part 114. In one embodiment, to exhaust the gas introduced through the entrance pipe 115, a diameter BD1 (shown in FIG. 3A) of the exit pipe 116 is equal to or greater than a diameter TD1 (shown in FIG. 3A) of the entrance pipe 115. If diameter BD1 of the exit pipe 116 is smaller than the diameter TD1 of the entrance pipe 115, it is more difficult to exhaust the gas introduced through the entrance pipe 115.

Since the second to fourth battery packs 120-140 are the same as the first battery pack 110, redundant explanations thereof will not be provided.

The first to fourth battery packs 110-140 are connected to the gas dividing unit 30 through the respective entrance pipes 115, 125, 135, and 145 (e.g., shown in FIG. 3A). For the following discussion, a battery pack positioned closest to the gas dividing unit 30 is referred to as the first battery pack 110, and a battery pack positioned farthest from the gas dividing unit 30 is referred to as the fourth battery pack 140. When gas is concurrently (e.g., simultaneously) distributed to the first and fourth battery packs 110 and 140 from the gas dividing unit 30, the supply of the gas to the battery pack (e.g., the first battery pack 110) that is relatively close to the gas dividing unit 30 is better than to the battery pack (e.g., the fourth battery pack 140) that is relatively far from the gas dividing unit 30. In one embodiment, the gas can be efficiently supplied by increasing the diameter of the entrance pipe joined to the battery pack that is relatively far from the gas dividing unit 30. That is to say, the farther the battery pack is positioned from the gas dividing unit 30, the larger the diameter of the entrance pipe becomes. For example, in FIG. 3A, a diameter TD2 of an entrance pipe 125 of the second battery pack 120 is greater than the diameter TD1 of the entrance pipe 115 of the first battery pack 110. In addition, a diameter TD3 of an entrance pipe 135 of the third battery pack 130 is greater than the diameter TD2 of the entrance pipe 125 of the second battery pack 120. Further, a diameter TD4 of an entrance pipe 145 of the fourth battery pack 140 is greater than the diameter TD3 of the entrance pipe 135 of the third battery pack 130 (i.e., TD1<TD2<TD3<TD4).

Referring back to FIG. 2, a temperature measuring unit 21, a gas sensor 22, and a storage unit 23 may be connected to the controller 20.

The temperature measuring unit 21 measures temperatures of the plurality of battery packs 110, 120, 130, and 140 through the temperature sensors connected thereto, respectively. Here, the temperature measuring unit 21 measures the temperatures of the plurality of battery packs 110, 120, 130, and 140 and transmits the measured temperatures to the controller 20. Then, the controller 20 stores the temperatures of the plurality of battery packs 110, 120, 130, and 140 in the storage unit 23.

The gas sensor 22 may detect a gas generated from the plurality of battery packs 110, 120, 130, and 140 through sensors connected thereto, respectively. In addition, the gas sensor 22 may transmit information on the battery pack associated with gas generation to the controller 20.

The storage unit 23 stores the measured temperatures of the plurality of battery packs 110, 120, 130, and 140 from the temperature measuring unit 21. In addition, a first reference temperature and a second reference temperature used to detect an overheated battery pack or a combusting (e.g., burning) battery pack are stored in the storage unit 23.

The controller 20 controls the temperature measuring unit 21 to measure the temperatures of the plurality of battery packs 110, 120, 130, and 140 at set (e.g., predetermined) time intervals. The controller 20 compares the temperatures of the plurality of battery packs 110, 120, 130, and 140 measured by the temperature measuring unit 21 with a first reference temperature REF1 and determines whether any of the measured temperatures is higher than the first reference temperature REF1. Based on the comparison result, the controller 20 determines that a battery pack having a temperature higher than the first reference temperature REF1 is an overheated battery pack, and opens a compressor valve 41 and a valve corresponding to the overheated battery pack to cool the battery pack.

For example, if the measured temperature of the second battery pack 120 is higher than the first reference temperature REF1, the controller 20 opens the compressor valve 41 provided between the air compressor 40 and the gas dividing unit 30, and opens a second valve 32 connected to the second battery pack 120 having a temperature higher than the first reference temperature REF1. Then, cold air that is compressed by the air compressor 40 flows toward the second battery pack 120 via the opened valve 32 of the gas dividing unit 30, thereby cooling the second battery pack 120. If the temperature of the second battery pack 120 becomes lower than the first reference temperature REF1, the controller 20 closes the second valve 32 connected to the second battery pack 120 and the compressor valve 41.

In another example, if the measured temperatures of the first and second battery packs 110 and 120 among the plurality of battery packs 110, 120, 130, and 140 are higher than the first reference temperature REF1, the controller 20 opens the compressor valve 41 and a first valve 31 and the second valve 32 respectively connected to the first and second battery packs 110 and 120, thereby cooling the first and second battery packs 110 and 120. Here, if the temperature of the first battery pack 110 becomes lower than the first reference temperature REF1 and the temperature of the second battery pack 120 is still higher than the first reference temperature REF1, the controller 20 closes only the first valve 31 connected to the first battery pack 110. That is to say, if the measured temperature of at least one among the plurality of battery packs 110, 120, 130, and 140 is higher than the first reference temperature REF1, the controller 20 opens the compressor valve 41.

The controller 20 compares the temperatures of the plurality of battery packs 110, 120, 130, and 140 measured by the temperature measuring unit 21 with the first reference temperature REF1 and determines whether a temperature of the battery pack having its temperature higher than the first reference temperature REF1 is higher than a second reference temperature REF2. Here, the second reference temperature REF2 is set to be higher than the first reference temperature REF1. If there is a battery pack having a temperature higher than the first reference temperature REF1 and the second reference temperature REF2, the controller 20 determines that the battery pack is in combustion, and opens an extinguishing valve 51 and a valve of the combusting battery pack to extinguish the combustion.

For example, if the measured temperature of the second battery pack 120 is higher than the first reference temperature REF1 and the second reference temperature REF2, the controller 20 opens the extinguishing valve 51 provided between the extinguishing unit 50 and the gas dividing unit 30 and the second valve 32 connected to the second battery pack 120. Then, extinguishing gas compressed in the extinguishing unit 50 flows toward the second battery pack 120 via the opened second valve 32 of the gas dividing unit 30, thereby extinguishing the combustion of the second battery pack 120.

If the temperature of the second battery pack 120 becomes lower than the first reference temperature REF1 and the second reference temperature REF2, the controller 20 closes the second valve 32 connected to the second battery pack 120 and the extinguishing valve 51.

The controller 20 controls the gas sensor 22 to detect whether gas is generated from the plurality of battery packs 110, 120, 130, and 140 at set (e.g., predetermined) time intervals. Upon receiving information on a battery pack detected to generate the gas from the gas sensor 22, the controller 20 opens the compressor valve 41 and a valve of the detected battery pack to exhaust the gas generated from the battery pack. When the gas sensor 22 notifies the controller 20 that no gas is detected from the battery pack, the controller 20 closes the compressor valve 41 and the valve of the battery pack.

As described above, the controller 20 allows the overheated battery pack among the plurality of battery packs 110, 120, 130, and 140 to be cooled. In addition, the controller 20 allows the battery pack to which combustion occurs to be extinguished. Further, the controller 20 allows the gas generated from the battery pack to be released.

The gas dividing unit 30 is positioned between the plurality of battery packs 110, 120, 130, and 140 and the air compressor 40, and includes a plurality of valves 31, 32, 33, and 34 corresponding to the plurality of battery packs 110, 120, 130, and 140. In other words, the first valve 31 is connected to the first battery pack 110, the second valve 32 is connected to the second battery pack 120, the third valve 33 is connected to the third battery pack 130, and the fourth valve 34 is connected to the fourth battery pack 140. Air is supplied to the plurality of battery packs 110, 120, 130, and 140 by controlling the plurality of valves 31, 32, 33, and 34 in the gas dividing unit 30.

The air compressor 40 is connected to the gas dividing unit 30, and compresses the air with a pressure greater than atmospheric pressure, producing compressed air. In some embodiments, a suitable cooling unit may be connected to the air compressor 40 to cool the compressed air. The compressor valve 41 is connected to the air compressor 40, and the air may be supplied to the gas dividing unit 30 or interrupted by opening or closing the compressor valve 41. The compressor valve 41 may be openably actuated under the control of the controller 20.

The extinguishing unit 50 is connected to the gas dividing unit 30, separately from the air compressor 40. Extinguishing gas is compressed in the extinguishing unit 50. The extinguishing gas is an incombustible gas, and examples thereof may be at least one selected from the group consisting of carbon dioxide ($CO_2$), nitrogen (N), argon (Ar), neon (Ne), helium (He), and krypton (Kr). The compressed extinguishing gas may readily extinguish the combusting battery pack. The extinguishing valve 51 is connected to the extinguishing unit 50, and the extinguishing gas may be supplied to the gas dividing unit 30 or interrupted by opening or closing the extinguishing valve 51. Here, the extinguishing valve 51 may be openably actuated under the control of the controller 20.

A driving method of a battery system according to one embodiment of the present invention will now be described.

Figure 4A:
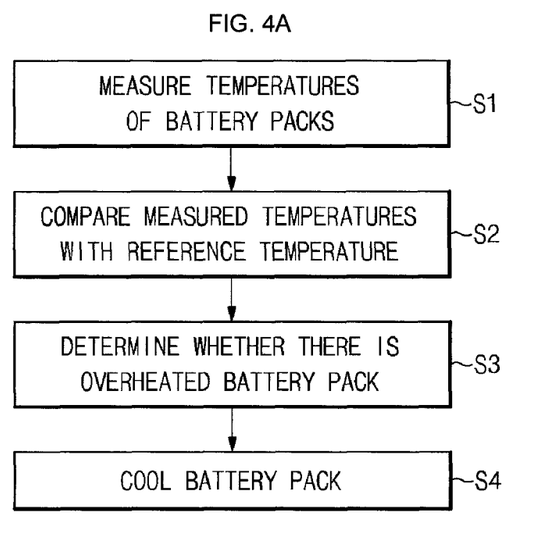
FIGS. 4A and 4B show flow charts illustrating a driving method of a battery system according to one embodiment of the present invention.
Figure 4B:
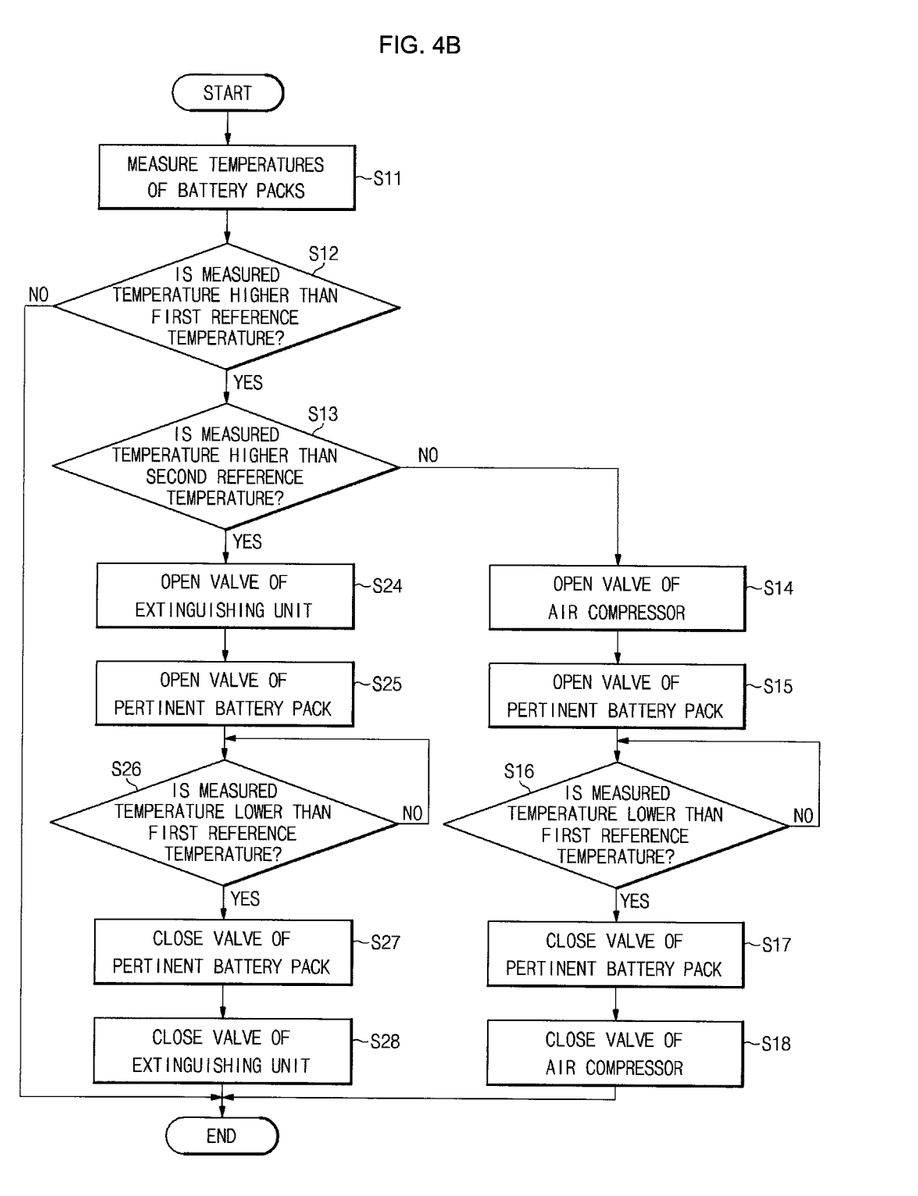

FIGS. 4A and 4B are flow charts illustrating a driving method of a battery system according to one embodiment of the present invention.

Referring to FIG. 4A, the driving method of a battery system according to one embodiment of the present invention includes measuring temperatures of battery packs (S1), comparing the measured temperatures of the battery packs with a reference temperature (S2), determining whether there is an overheated battery pack (S3), and cooling the overheated battery pack (S4), which will be described in more detail with reference to FIG. 4B.

In S1, the temperature measuring unit 21 measures temperatures of the plurality of battery packs 110, 120, 130, and 140 through the temperature sensors connected thereto, respectively (S11).

In S2, the controller 20 compares the temperatures of the plurality of battery packs 110, 120, 130, and 140 measured by the temperature measuring unit 21 with a first reference temperature REF1 (S12). Here, if the measured temperature of at least one among the plurality of battery packs 110, 120, 130, and 140 is higher than the first reference temperature REF1, the controller 20 compares a temperature of the battery pack having the higher temperature than the first reference temperature REF1 with a second reference temperature REF2 (S13). Here, the second reference temperature REF2 is set to be higher than the first reference temperature REF1.

If the temperature of each of the plurality of battery packs 110, 120, 130, and 140 measured by the temperature measuring unit 21 is lower than the first reference temperature REF1, it is determined that the plurality of battery packs 110, 120, 130, and 140 are not overheated and the flow chart in FIG. 4B is terminated. The temperatures of the plurality of battery packs 110, 120, 130, and 140 are repeatedly measured such that the aforementioned procedure is repeatedly performed.

In one example, a temperature of the battery pack is higher than the first reference temperature REF1 and lower than the second reference temperature REF2.

If a temperature of the battery pack is higher than the first reference temperature REF1 and lower than the second reference temperature REF2, in S3, it is determined whether there is an overheated battery pack. That is to say, the controller 20 determines that the battery pack is overheated and opens the compressor valve 41 connected to the air compressor 40 (S14), and opens the valve of the overheated battery pack (S15).

In step S4, cold air that is compressed by the air compressor 40 is supplied to the battery pack through the entrance pipe joined to the entrance part of the battery pack. The battery pack is cooled by the compressed cold air supplied from the air compressor 40. The controller 20 is notified of the temperature of the battery pack from the temperature measuring unit 21, and compares the temperature of the battery pack with the first reference temperature REF1 (S16). If the temperature of the battery pack becomes lower than the first reference temperature REF1, the controller 20 determines that the battery pack is sufficiently cooled and closes the valve of the cooled battery pack (S17) and also closes the compressor valve 41 of the air compressor 40 (S18). If the temperature of the battery pack is higher than the first reference temperature REF1, the controller 20 determines that the battery pack is yet to be cooled, and continuously supplies the cold air to the overheated battery pack without closing the valve of the overheated battery pack and the compressor valve 41.

Next, assume that a temperature of the battery pack is higher than the first reference temperature REF1 and the second reference temperature REF2.

If a temperature of the battery pack is higher than the first reference temperature REF1 and the second reference temperature REF2, in S3, it is determined whether there is an overheated battery pack. That is to say, the controller 20 determines that the battery pack is overheated and combustion occurs thereto, and opens the extinguishing valve 51 connected to the extinguishing unit 50 (S24), and opens the valve of the combusting battery pack (S25).

In S4, extinguishing gas compressed in the extinguishing unit 50 is supplied to the battery pack through the entrance pipe joined to the entrance part of the battery pack. The combustion of the battery pack is extinguished by the compressed extinguishing air supplied from the extinguishing unit 50. The controller 20 is notified of the temperature of the battery pack from the temperature measuring unit 21, and compares the temperature of the battery pack with the first reference temperature REF1 (S26). If the temperature of the battery pack becomes lower than the first reference temperature REF1, the controller 20 determines that the battery pack is extinguished and sufficiently cooled and closes the valve of the cooled battery pack (S27) and also closes the extinguishing valve 51 of the extinguishing unit 50 (S28). Here, a user can replace the overheated or combusted battery pack that is extinguished with new one. If the temperature of the battery pack is higher than the first reference temperature REF1, the controller 20 determines that the battery pack is yet to be cooled, and continuously supplies the extinguishing gas to the combusting and/or overheated battery pack without closing the valve of the battery pack and the extinguishing valve 51.

As described above, in the battery system according to one embodiment of the present invention, and the driving method thereof, a plurality of battery packs are placed in a battery case, and an overheated battery pack among the plurality of battery packs is detected by measuring temperatures of the respective battery packs, thereby cooling the overheated battery pack. Therefore, according to embodiments of the present invention, the overheated battery pack among the plurality of battery packs is selectively cooled, thereby improving the overall battery performance.

In addition, according to embodiments of the present invention, a plurality of battery packs are placed in a battery case, and a battery pack where combustion occurs may be detected among the plurality of battery packs by measuring temperatures of the respective battery packs, thereby extinguishing the combustion of the battery pack. Accordingly, the combusting battery pack can be selectively replaced.

A driving method of a battery system according to another embodiment of the present invention will now be described.

Figure 5:
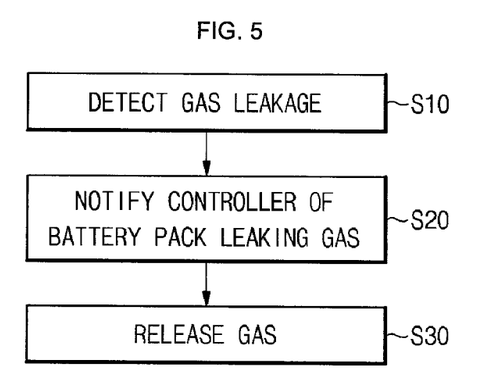
FIG. 5 is a flow chart illustrating a driving method of a battery system according to another embodiment of the present invention.

FIG. 5 is a flow chart illustrating a driving method of a battery system according to another embodiment of the present invention.

Referring to FIG. 5, the driving method of a battery system according to another embodiment of the present invention includes detecting gas leakage (S10), notifying the controller of a battery pack that leaks gas (S20), and releasing the gas (S30).

In S10, the gas sensor 22 detects whether gas is generated from the plurality of battery packs 110, 120, 130, and 140 through sensors connected thereto.

In S20, if it is detected that gas is generated from at least one among the plurality of battery packs 110, 120, 130, and 140, the gas sensor 22 notifies the controller 20 that there is a battery pack that generates gas.

In S30, the controller 20 receives information on the battery pack associated with gas generation from the gas sensor 22, and opens the compressor valve 41 connected to the air compressor 40 and the valve of the battery pack that is leaking gas. If the compressor valve 41 is opened, the air compressed by the air compressor 40 is supplied to the battery pack through the entrance pipe joined to the entrance part of the battery pack. The battery pack is cooled by the compressed cold air supplied from the air compressor 40, and the gas generated from battery pack is exhausted through the exit pipe. If no more gas is detected from the battery pack, the controller 20 closes the valve of the battery pack and the compressor valve 41.

As described above, in the battery system according to one embodiment of the present invention, and the driving method thereof, a plurality of battery packs are placed in a battery case, and amounts of gas generated from the respective battery packs are measured to detect a battery pack associated with gas leakage among the plurality of battery packs, and the gas generated from battery pack associated with gas leakage is released, thereby improving the overall battery performance.

Although exemplary arrangements and actuation mechanisms in the battery system and the driving method thereof according to the present invention have been illustrated through particular embodiments, it should be understood that many variations and modifications may be made in those embodiments without departing from the spirit and scope of the present invention as set forth in the following claims and their equivalents.

What is claimed is:

1. A driving method of a battery system, the battery system comprising a plurality of battery packs and a gas dividing unit comprising a plurality of valves, the method comprising:
   measuring temperatures of the plurality of battery packs;
   comparing the measured temperatures of the plurality of battery packs with a first reference temperature;
   when the measured temperature of one or more of the plurality of battery packs is higher than the first reference temperature, determining that the one or more of the plurality of battery packs are overheated; and
   cooling the overheated one or more of the plurality of battery packs by selectively opening a corresponding one or more of the valves of the gas dividing unit to provide a cooling air to the overheated one or more of the plurality of battery packs,
   wherein a battery pack of the battery packs comprises an entrance part for receiving the cooling air into the battery pack, an exit part for discharging the cooling air out of the battery pack, and a curved distribution member located inside the entrance part for changing the direction of the cooling air to distribute the cooling air for the cooling air to contact a plurality of battery cells in the battery pack while passing between the plurality of battery cells.

2. The driving method of claim 1, wherein the cooling of the overheated one or more of the battery packs further comprises opening a valve of an air compressor for providing the cooling air to the overheated one or more of the battery packs.

3. The driving method of claim 1, wherein the comparing of the battery pack temperatures with the first reference temperature comprises setting a second reference temperature higher than the first reference temperature.

4. The driving method of claim 3, wherein when at least one of the temperatures of the battery packs is higher than the second reference temperature, the cooling of the overheated one or more of the plurality of battery packs further comprises opening a valve of an extinguishing unit.

* * * * *